(12) United States Patent
Baumbach (10) Patent No.: US 10,959,022 B1
(45) Date of Patent: Mar. 23, 2021

(54) ADJUSTING THE OUTPUT OF HEADPHONES BASED ON EXTERNAL INPUTS

(71) Applicant: Disney Enterprises, Inc., Burbank, CA (US)

(72) Inventor: Elliott H. Baumbach, Porter Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/784,131

(22) Filed: Feb. 6, 2020

(51) Int. Cl.
*H04R 5/04* (2006.01)
*G06F 3/16* (2006.01)

(52) U.S. Cl.
CPC .............. *H04R 5/04* (2013.01); *G06F 3/165* (2013.01); *H04R 2420/03* (2013.01); *H04R 2420/05* (2013.01); *H04R 2460/01* (2013.01)

(58) Field of Classification Search
None
See application file for complete search history.

(56) References Cited

U.S. PATENT DOCUMENTS

| | | | |
|---|---|---|---|
| 8,275,135 B2* | 9/2012 | Azizi | H03G 3/301 381/57 |
| 9,374,448 B2* | 6/2016 | Miller | H04M 1/7255 |
| 9,383,964 B1* | 7/2016 | Kuruba Buchannagari | A63F 13/54 |
| 10,334,348 B2 | 6/2019 | Pergament et al. | |
| 10,514,888 B1* | 12/2019 | Rodgers | G10L 25/78 |
| 10,652,853 B2* | 5/2020 | Nguyen | H03G 3/32 |
| 2006/0153398 A1* | 7/2006 | Deetz | H03G 3/32 381/86 |
| 2012/0052948 A1* | 3/2012 | Soelberg | A63F 13/54 463/35 |

(Continued)

FOREIGN PATENT DOCUMENTS

| CN | 101227759 B | 1/2013 |
|---|---|---|
| CN | 107272900 A | 10/2017 |

(Continued)

OTHER PUBLICATIONS

Adaptive Sound Technologies, Inc., "Introducing the Novo", Nov. 2015, 15 pages <http://www.asticorp.com/wp-content/uploads/2015/11/Novo-Product-User-Guide.pdf>.

*Primary Examiner* — Paul W Huber
(74) *Attorney, Agent, or Firm* — Patterson + Sheridan, LLP (57) ABSTRACT

Embodiments provide techniques for controlling an audio output for a headphone system. In one embodiment, a headphone system comprising a speaker, a communication interface configured to receive a first audio signal from a first audio source hosted on a first computing device and a master audio signal from a master audio source hosted on a second computing device separate from the first computing device, wherein the first audio source and master audio source are separate from the headphone system, and an audio control module, is configured to output the first audio signal on the speaker using a first volume level, receive the master audio signal, and in response, decrease a volume of the first audio signal relative to the first volume level, output the master audio signal on the speaker at a second volume level greater than the decreased volume of the first audio signal, and after determining the master audio signal is finished, increase the volume of the first audio signal.

18 Claims, 6 Drawing Sheets

(56) References Cited

U.S. PATENT DOCUMENTS

| | | | | |
|---|---|---|---|---|
| 2016/0284206 A1* | 9/2016 | Boettcher | ............... | A01N 1/021 |
| 2016/0328248 A1* | 11/2016 | Rothkopf | ................. | H01H 9/00 |
| 2017/0201832 A1* | 7/2017 | Reynolds, Jr. | ....... | H04R 1/1041 |
| 2018/0332391 A1 | 11/2018 | Zhao et al. | | |

FOREIGN PATENT DOCUMENTS

| | | |
|---|---|---|
| CN | 109151648 A | 1/2019 |
| CN | 109688505 A | 4/2019 |
| WO | 2017143714 A1 | 8/2017 |

\* cited by examiner

ADJUSTING THE OUTPUT OF HEADPHONES BASED ON EXTERNAL INPUTS

BACKGROUND

Audio ducking is a technique for temporarily lowering the volume of a first audio signal for a period of time, during which a second audio signal can be heard over the first audio signal. Ducking is commonly used in media for narration over music, or for language translations over original speakers.

Generally, an audio controller or mixer performs audio ducking on two or more audio signals, and then exports a combined, ducked audio signal for external playback. For example, the audio controller or mixer can use audio ducking to correlate two audio tracks, so that as one track plays; the other track gets quieter. A common use of audio ducking is for voice-overs where the music fades into the background as speech from a narrator begins.

SUMMARY

In one embodiment, a headphone system comprises a speaker; a communication interface configured to receive a first audio signal from a first audio source hosted on a first computing device and a master audio signal from a master audio source hosted on a second computing device separate from the first computing device, wherein the first audio source and master audio source are separate from the headphone system; and an audio control module configured to output the first audio signal on the speaker using a first volume level, receive the master audio signal, and in response, decrease a volume of the first audio signal relative to the first volume level, output the master audio signal on the speaker at a second volume level greater than the decreased volume of the first audio signal, and after determining the master audio signal is finished, increase the volume of the first audio signal.

In another embodiment, a method comprises receiving, at a headphone system, a first audio signal from a first audio source; outputting the first audio signal on a speaker in the headphone system using a first volume level; in response to receiving a master audio signal from a master audio source, decreasing a volume of the first audio signal relative to the first volume level, wherein the first audio source and the master audio source are separate from the headphone system; outputting the master audio signal on the speaker at a second volume level greater than the decreased volume of the first audio signal, and after determining the master audio signal is finished, increasing the volume of the first audio signal.

In another embodiment, A method comprises receiving, at a headphone system, a first audio signal from a first audio source; outputting the first audio signal on a speaker in the headphone system using a first volume level; limiting a volume of the first audio signal to a second volume level less than the first volume level for a period of time based on a predetermined schedule; and after determining the period of time has ended, increasing the volume of the first audio signal.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

So that features of the present disclosure can be understood in detail, embodiments of the present invention disclosed herein may reference audio output devices such as earphones, headphones or headphone systems, in-ear or over-the-ear earpieces, or the like. Similarly, embodiments of the present invention disclosed herein may reference wireless technologies such as Bluetooth Low Energy (BLE), Bluetooth, Wi-Fi, or the like. However, the disclosed embodiments should not be interpreted as being confined to any of the aforementioned technologies.

It may be difficult for a user of a headphone system to hear audio from external sources when inundated with audio presently playing from the headphone system. This issue is exacerbated when distance between the external audio and the user of the headphone system increases. Hence, embodiments of the present disclosure provide for reliable conveyance of audio from an external source to a user of the headphone system when the user may otherwise be preoccupied with audio already playing from the headphone system. The headphone system can include any audio device that is supported by the user and includes such devices as earphones, headphones, in-ear or over-the-ear earpieces, hand-held entertainment devices, or the like.

In one embodiment, audio ducking is implemented to better convey a message to a user of the headphone system. The audio ducking is used to lower the volume of a first audio signal for a period of time, during which a second audio signal can be heard over the first audio signal. During this period of time, the headphone system relays a message, based on the second audio signal, to a user of the headphone system. Once the message is delivered, the headphone system can return the first audio signal to its initial volume level. In this manner, the second audio signal is a master signal that overrides (e.g., has a higher priority) than the first audio signal.

For example, assume a user of the headphone system is located in a different room of a building than a second person. The user may be listening to music on the headphone system, and therefore may be unable to hear communications from the second person, even if the second person attempts to communicate with the user by electronic means (e.g., by texting from a mobile device). In such a circumstance, the headphone system performs audio ducking to temporarily lower the volume of the music, and can relay the message texted by the second person to the user. Afterwards, the headphone system can return to playing the music at the pre-ducked volume.

Figure 1:
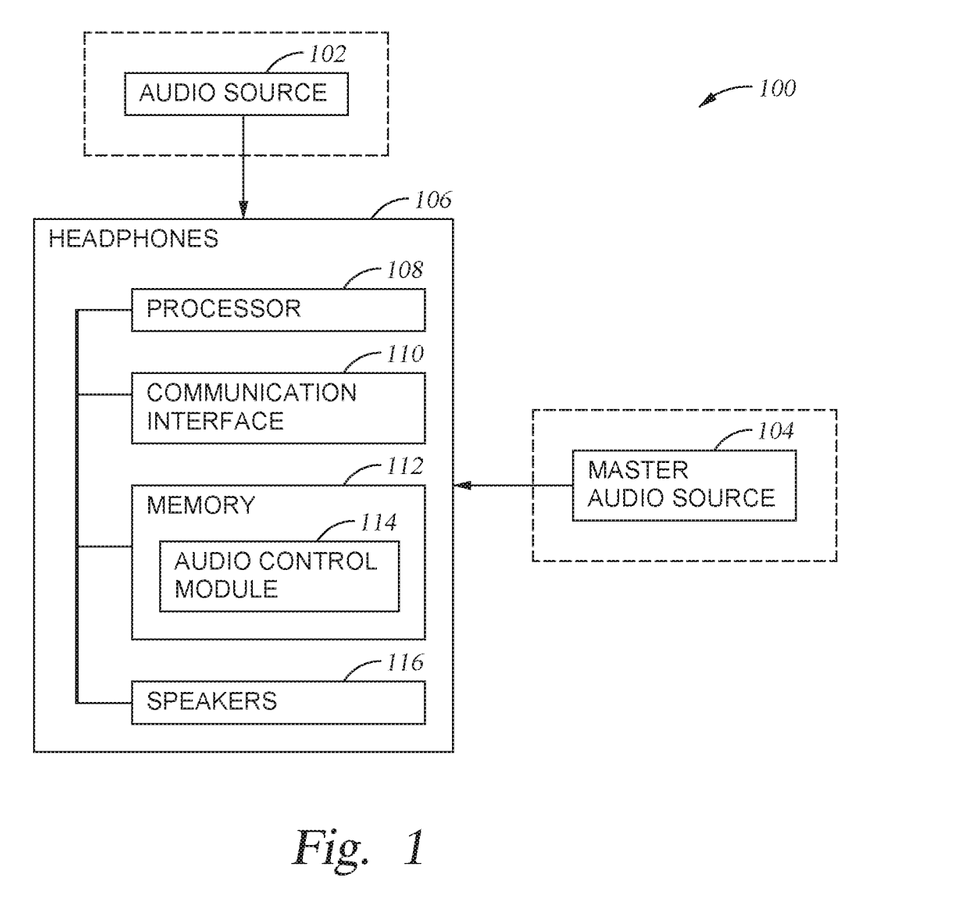
FIG. 1 is an illustration of an audio system, according to one embodiment.

FIG. 1 is an illustration of an audio system 100, according to one embodiment. The audio system 100 includes an audio source 102, a headphone system 106, and a master audio source 104.

In one embodiment, the audio source 102 is a streaming service, a media platform, or media storage. For example, the audio source 102 may be a music streaming service, a video streaming service, a video-game streaming service, a video game console, a personal computer, a mobile phone or mobile music player or other mobile device, a stereo system, and the like. In some embodiments, the first audio signal is associated with audio from entertainment media such as a movie, music, a television show, a video game, or the like.

The audio source 102 is communicatively coupled to headphone system 106 via communication interface 110. The communication interface 110 can include a wireless communication interface, or a physical communication interface such as a headphone jack compatible with a 2.5 mm audio plug, 3.5 mm audio plug, 6.3 mm audio plug, or the like. The audio source 102 can use its communicative coupling to the headphone system 106 to supply a first set of audio signals to the headphone system 106.

In some embodiments, the master audio source 104 is computer hardware or software that generates an audio signal upon recognizing an input command or verbalized communication. The master audio source 104 can be communicatively coupled to the headphone system 106 via the communication interface 110. The master audio source 104 can use its communicative coupling to the headphone system 106 to supply a master audio signal to an audio control module 114 in the headphone system 106.

In the illustrated embodiment, the headphone system 106 includes a processor 108, memory 112 and storage (not shown), a communication interface 110, and one or more speakers 116. The headphone system 106 is generally controlled by firmware (not shown), software, hardware, or a combination thereof.

In one embodiment, the processor 108 is a hardware logic device that can perform instruction, logic, and mathematical processing. The processor 108 may retrieve and execute programming instructions stored in memory 112, or store and retrieve application data residing in the storage. The processor 108 is generally representative of one or more CPUs or GPUs, or a single CPU or GPU having multiple processing cores, and the like.

The memory 112 may be representative of a random access memory. The storage may be representative of hard-disk drives, solid state drives, flash memory devices, and the like. The storage can include fixed or removable storage devices, such as fixed disk drives, removable memory cards, caches, network attached storage (NAS), or storage area networks (SAN). The memory 112 and the storage can also include memory or storage physically located away from the headphone system 106. For example, the memory 112 or storage may be located on another computer coupled to the headphone system 106 via the communication interface 110.

The communication interface 110 can include any type of wireless or physical communications interface allowing the headphone system 106 to communicate with other computers or audio sources directly or via a communication network. The one or more speakers 116 can output audio to a user of the headphone system 106. The speakers 116 can be disposed in earphones, headphone systems, in-ear or over-the-ear earpieces, or the like. Further, the speakers 116 can be part of a mobile device where the user hold the speaker 116 up to her ear.

In the illustrated embodiment, the memory 112 includes an audio control module 114. The audio control module 114 can be configured to implement real-time audio ducking to better convey a message to a user of the headphone system 106. The audio control module 114 can temporarily lower the volume of a first audio signal received from the audio source 102 for a period of time, during which a second audio signal received from the master audio source 104 can be heard over the first audio signal. That is, the second audio signal has a greater volume than the first audio signal. The first audio source and master audio source can each generate one or more audio signals, or groups of audio signals.

In one embodiment, the first audio signal may not be outputted at all, or may have a volume of zero, during the period of time the second audio signal is outputted by the speakers 116. During this period of time, the headphone system 106 relays a message, based on the second audio signal, to a user of the headphone system 106.

The master audio signal can be associated with an input from a user to the master audio source 104. For example, the input can be a physical input command, recorded audio, a voice message, or the like. For instance, the input can be an option selected via a touchscreen on a mobile device, a recording of the user voicing a message, a pre-recorded audio, or the like.

In one embodiment, the headphone system 106 receives, at communication interface 110. The headphone system 106 can output the first and second audio signals such that both sets of audio signals can be heard simultaneously by the user of the headphone system 106, but at different volumes. After outputting a portion, or the entirety, of the master set of audio signals, the headphone system 106 ceases output of the master set of audio signals, and can increase the volume of the first set of audio signals to its pre-lowered volume.

Figure 2:
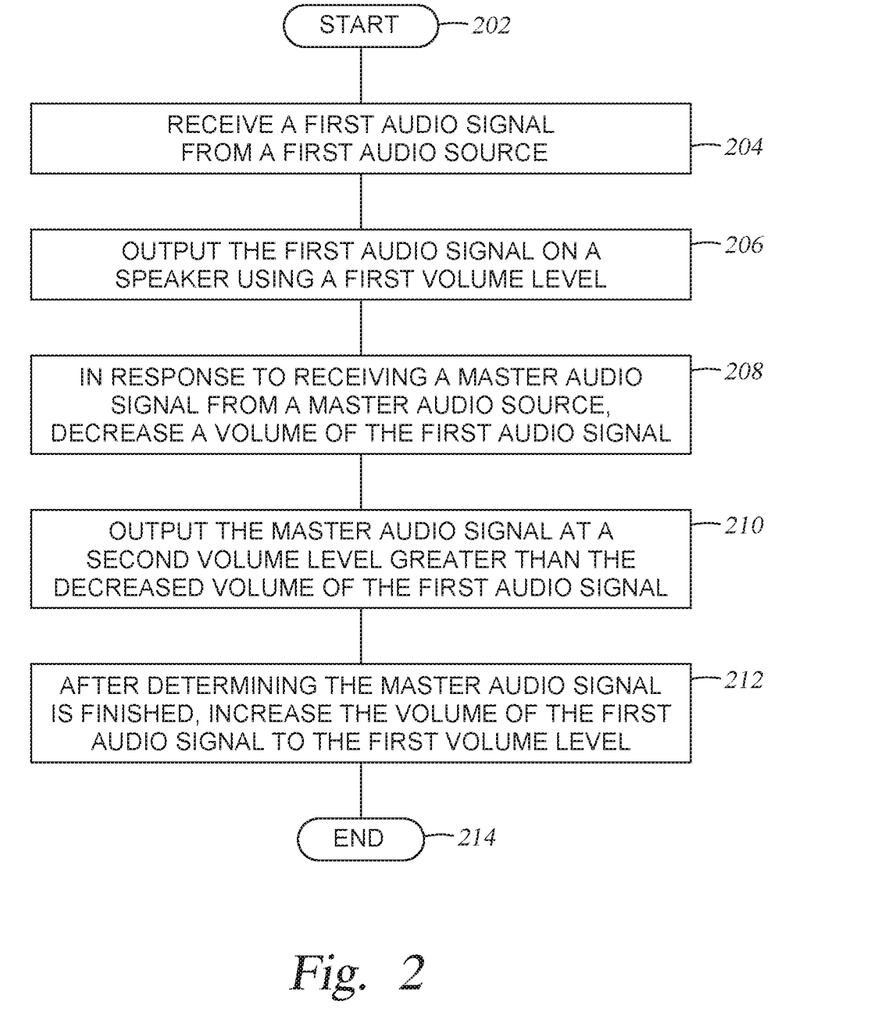
FIG. 2 is a flow chart of a method for delivering a message during audio ducking on a headphone system, according to one embodiment.

FIG. 2 is a flow chart of a method for delivering a message during audio ducking on a headphone system, according to one embodiment. The method begins at block 202.

At block 204, the headphone system receives a first audio signal from a first audio source, wirelessly or via a wired connection. At block 206, the headphone system outputs the first audio signal to a user on a speaker using a first volume level. In some embodiments, the first audio signal is associated with audio from entertainment media such as a movie, music, a television show, a video game, or the like. In one embodiment, the audio source is a streaming service, a media platform, or media storage. In some embodiments, the first audio signal is associated with audio from entertainment media such as a movie, music, a television show, a video game, or the like.

At block 208, the headphone system receives a master audio signal from a master audio source, and, in response, decreases a volume of the first audio signal. In some embodiments, the master audio signal can be associated with an input from a user to the master audio source 104. For example, the input can be a physical input command, recorded audio, a voice message, or the like.

In response to receiving the master audio signal (the ducking signal), the headphone system decreases the volume of the first audio signal (the ducked signal), which provides a quieter environment for the user of the headphone system. In some embodiments, the master audio source can include priority data in the master audio signal to aid the headphone system in identifying the master audio signal as a ducking signal. For example, the master audio source can embed flag data, metadata, priority levels, or other priority data, in the master audio signal to indicate that the master audio signal is the ducking signal. Hence, the headphone system can use this priority data to determine which received audio signal is the ducking signal and which received audio signal is the ducked signal, irrespective of the time or order in which the audio signals are received.

For instance, if a headphone system receives the master audio signal (absent any indication of priority) before receiving the first audio signal, then the headphone system may assume that the master audio signal is the ducked signal and the first audio signal is the ducking signal. In this case, the headphone system may quiet the master audio signal while playing the first audio signal at a greater volume than the master audio signal. This may be an undesirable result since the master audio signal carries the message meant to play over the first audio signal. However, if the headphone system receives the master audio signal with an indication of priority before receiving the first audio signal, then the headphone system could determine that the master audio signal is the ducking signal and the first audio signal is the ducked signal. In this case, the headphone system could deem the first audio signal to be of lower priority than the master audio signal, and therefore know not to duck the master audio signal. Thus, the headphone system could continue to play the master audio signal (or even increase the volume of the master audio signal), while playing the first audio signal at a lower volume. Alternatively, the headphone system could continue to play the master audio signal without playing the first audio signal.

In some embodiments, the first audio source and the master audio source can each generate a plurality of respective audio signals with different priority indicators to indicate the priority of each first audio signal among the plurality of audio signals, the priority of each master audio signal among the plurality of audio signals, or the priority of each first audio signal in relation to each master audio signal. Thus, the headphone system could determine ducking priorities among a plurality of first and master audio signals. For example, the headphone system could consider a higher priority audio signal to be a ducking signal, and a lower priority audio signal to be a ducked signal.

For instance, the first audio source could generate first audio signals F1, F2, and F3, where "F" is a naming convention indicating a first audio signal having a lower priority than any master audio signal, and the number following "F" indicates higher to lower priority, in ascending order, among the first audio signals. The master audio source could generate master audio signals M1, M2, and M3, where "M" is a naming convention indicating a master audio signal having a higher priority than any first audio signal, and the number following "M" indicates a higher to lower priority, in ascending order, among the master audio signals. Therefore, if comparing audio signals F1 and F2, the headphone system could duck audio signal F2 using audio signal F1. If comparing audio signals M2 and M3, the headphone system could duck audio signal M3 using audio signal M2. In another instance, the headphone system could choose to use only "M" audio signals as ducking signals, and only "F" audio signals as ducked signals.

In one embodiment, the headphone system can determine which of the first audio signal or the master audio signal is the ducking signal based on the time of receipt. Therefore, the signal received first is ducking signal and the signal received second is the ducked signal.

At block 210, the headphone system outputs the master audio signal at a second volume level greater than the decreased volume of the first audio signal. The master audio signal is output to the user of the headphone system in the quieter environment generated by ducking the first audio signal to better convey the content of the master audio signal, or message based thereupon. For instance, if the master audio source receives an input command to remind the headphone user to clean the house (e.g., as an option selected via a touchscreen of a mobile device), then the master audio source can generate the master audio signal based on the input command (e.g., a pre-recorded computer voice stating "take out the trash"). The various ways that a user can use transmit a master audio signal to the headphone set are described in more detail below.

At block 212, after determining that the output or playback of the master audio signal, or the message based on the master audio signal, is finished, the headphone system increases the volume of the first audio signal. In some embodiments, the volume of the first audio signal is increased to the first volume level. Hence, the first audio signal is output at its pre-ducked volume. In one embodiment, the increase in volume of the first audio signal occurs after a portion, but not the entirety, of the master audio signal, or message based thereon, is finished. The method ends at block 214.

Figure 3:
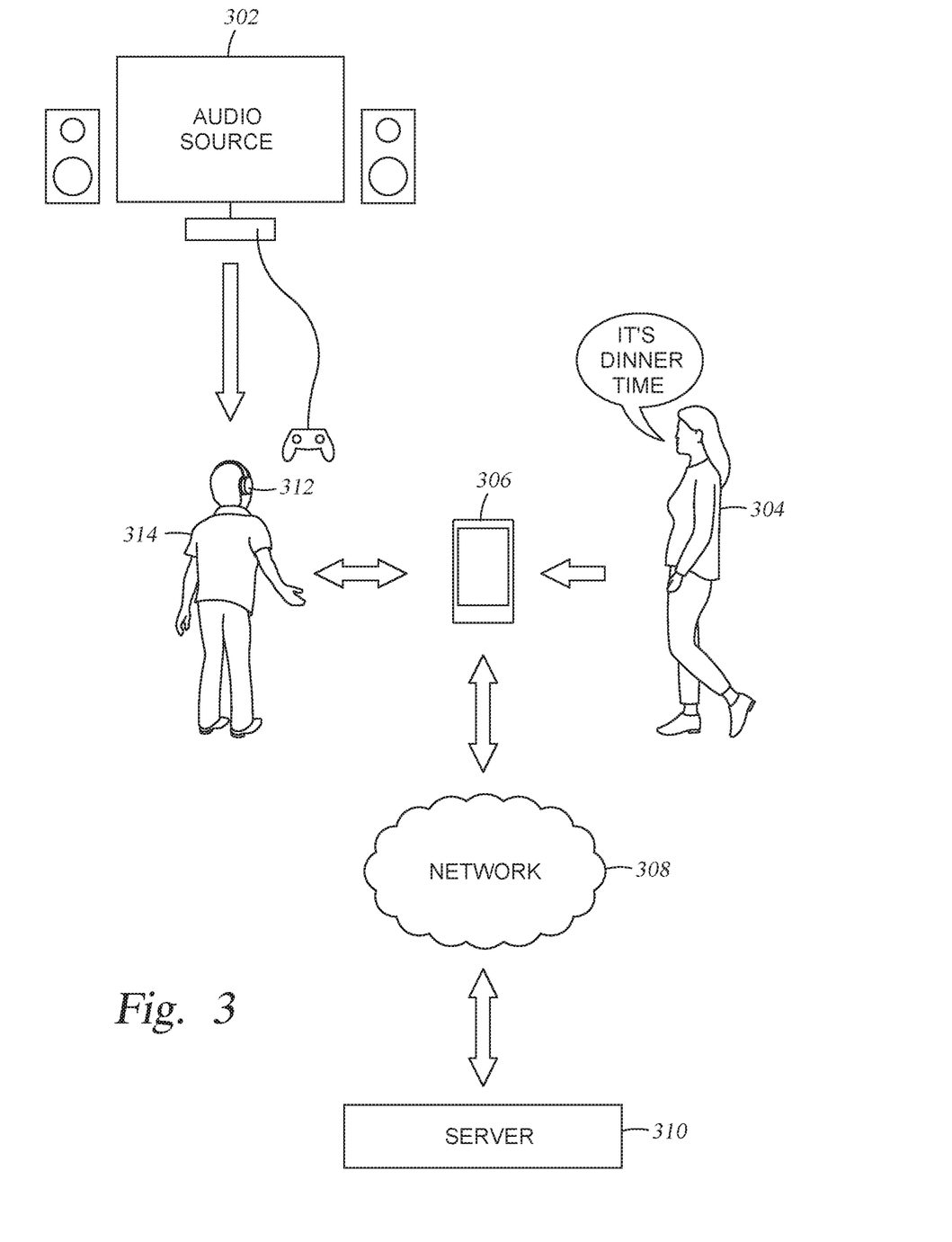
FIG. 3 is an illustration of a headphone system receiving a master audio signal from a software application, according to one embodiment.

FIG. 3 is an illustration of a headphone system receiving a master audio signal from a software application, according to one embodiment. In the illustrated embodiment, an audio source 302 is depicted as a video game entertainment system.

The audio source 302 can be communicatively coupled to headphone system 312 to supply a first audio signal to the headphone system 312. The communicative coupling can include wireless or wired coupling. The headphone system 312 outputs the first audio signal to a user 314 of the headphone system 312 via one or more speakers included with the headphone system 312.

For example, the user 314 of the headphone system 312 can be a child playing a video game on the home entertainment system. The first audio signal can be audio associated with the video game that is supplied to the headphone system 312 wirelessly. The headphone system 312 outputs the first audio signal to the child, via the one or more speakers included with the headphone system 312, which helps to immerse the child in the video game's environment.

In some embodiments, the headphone system 312 can be registered with a server 310 to allow for streamlined setup and communication between the headphone system 312 and software application executed on a mobile device 306. In one embodiment, the software application is a parental software application for reliably conveying a message from a parent to a child who is using the headphone system 312.

The server 310 can supply data to, and service requests from, the software application and the headphone system 312 via network 308. The network 308 may include, for example, a telecommunications network, a local or wide area network, the Internet, and the like. The network 308 can exchange data between the software application and the headphone system 312 via network 130.

In the illustrated embodiment, a user 304 of the software application can communicate with the user 314 of the headphone system 312 while the headphone system 312 outputs the first audio signal to the user 314 of the headphone system 312. Continuing the above example, the user 304 of the software application can be a parent wishing to communicate a message ("It's dinner time!") to her child.

In one embodiment, the parent can speak a vocal message into a microphone of the mobile device, and in response, the software application can generate a master audio signal based on the message which is transmitted to the headphone system 312. For instance, the master audio signal may comprise a digital recording of the message as spoken by the parent, or may comprise a pre-recorded audio signal retrieved from the server 310 based on a comparison between the message and one or more pre-recorded audio signals.

In some embodiments, the parent can select, as an input to the software application, one or more options displayed on the mobile device. For example, the software application's GUI may display options labelled "Dinner time," "Come downstairs," "Go to sleep," and the like. The software application can generate a master audio signal based on the option selected. For instance, if the option selected is labeled "Dinner time," then once the user 304 selects that option from the options displayed on the GUI of the software application, the software application generates a master audio signal comprising a pre-recorded audio, which corresponds to the selected option label, retrieved from the server 310. In this manner, the software application can provide a list of predefined messages that can be conveyed to the user 314 wearing the headphone system 312.

When the master audio signal is sent to the headphone system 312, the headphone system 312 decreases a volume of the first audio signal, which provides a quieter environment and breaks the child's immersion in video game's environment. During this time, the headphone system 312 outputs the master audio signal to the child at a volume greater than the decreased volume of the first audio signal. Therefore, the child, who may otherwise not have heard the message from the parent due to being immersed in the video game's environment, is now able to hear the master audio signal that conveys the message.

In some embodiments, after determining that the master audio signal has been output or played in its entirety, the headphone system 312 increases the volume of the first audio signal. In one embodiment, the increase in volume of the first audio signal occurs after a portion, but not the entirety, of the master audio signal has finished being output or played to the child.

Figure 4:
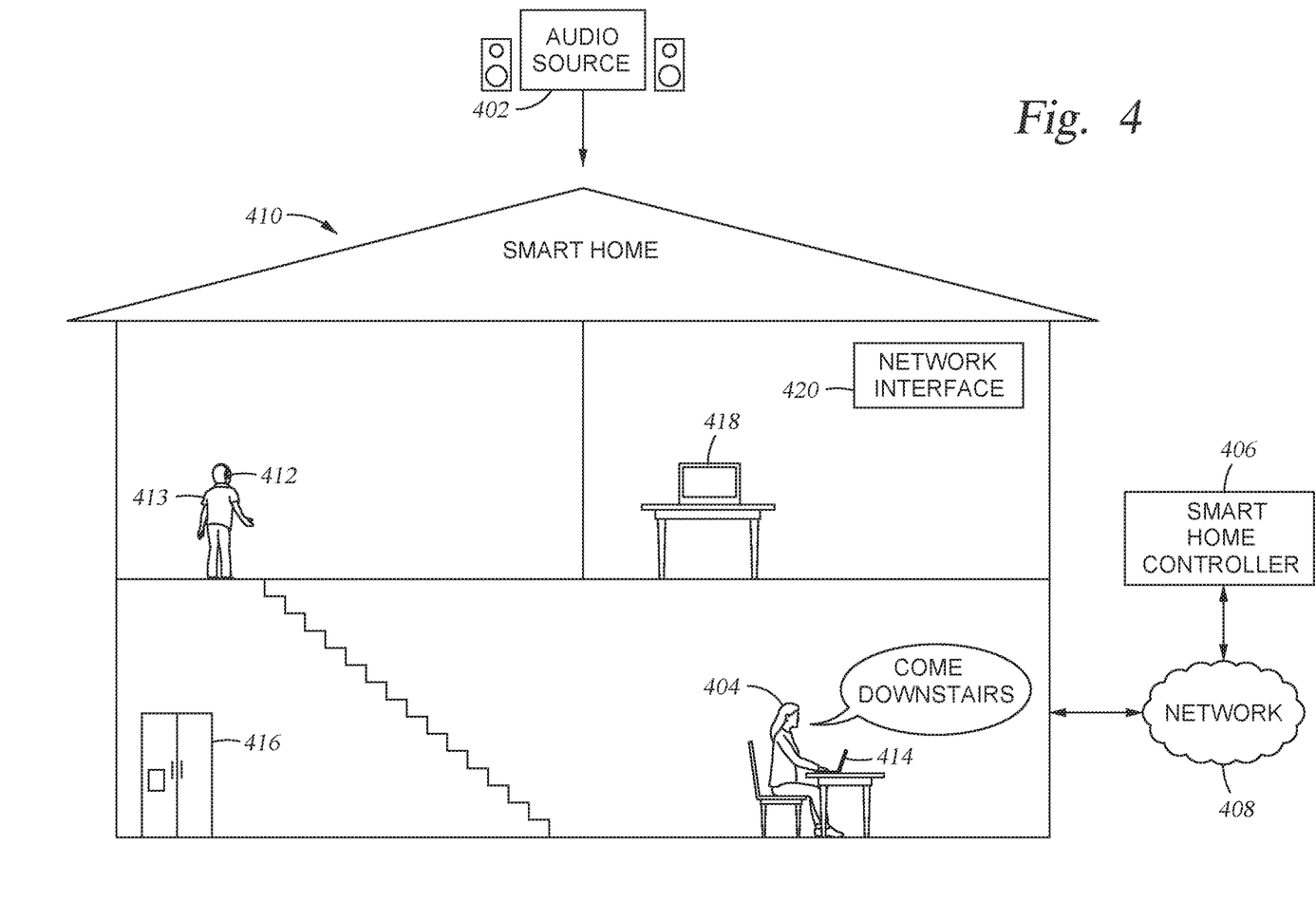
FIG. 4 is an illustration of a headphone system in a smart home environment, according to one embodiment.

FIG. 4 is an illustration of a headphone system in a smart home environment, according to one embodiment. In the illustrated embodiment, audio source 402 is depicted as a home entertainment system playing music.

Audio source 402 can be communicatively coupled to a smart home 410 that includes headphone system 412, or communicatively coupled directly to the headphone system 412. The audio source 402 supplies a first audio signal to the headphone system 412. The communicative coupling can include wireless or wired coupling. The headphone system 412 outputs the first audio signal to a user 413 of the headphone system 412 via one or more speakers included with the headphone system 412.

For example, the user 413 of the headphone system 412 can be a child listening to music on the home entertainment system. The first audio signal can be audio associated with a song that is supplied to the headphone system 412 wirelessly. The headphone system 412 outputs the first audio signal to the child, via the one or more speakers included with the headphone system 412. The volume of the first audio signal (or the audio isolation provided by the headphone system 412) may prevent the user 413 from hearing other people in the same environment as the user 413.

In the illustrated embodiment, the smart home 410 is communicatively coupled to the headphone system 412, and devices 414, 416, and 418. The smart home 410 is also communicatively coupled to a smart home controller 406 using a network interface 420 to transfer data across a network 408. The network 408 may include, for example, a telecommunications network, a local or wide area network, the Internet, and the like. The network interface 420 can include any type of network communications interface allowing the smart home 410 to communicate with the smart home controller 405.

The headphone system 412 and devices 414, 416, and 418, can be controlled via the smart home controller 406. In one embodiment, a user sets a schedule for controlling the volume output of the headphone system 412 using one of device 414, 416, or 416. The device transfers the schedule to the smart home controller 406, which uses this predetermined schedule to decrease a volume output of the headphone system 412, or directs the headphone system 412 to decrease the volume output of the first audio signal, for a period of time specified in the schedule. After the end of the period of time specified in the schedule, the smart home controller 406 ceases limiting the volume output of the headphone system 412.

In the illustrated embodiment, the smart home controller 406 controls an output of the headphone system 412, and provides a master audio signal to the headphone system 412. Continuing the above example, a parent can use one of the devices (for instance, device 414) to convey a message ("Come downstairs!") to her child, while the headphone system 412 outputs the first audio signal to the child. That is, the parent can use a voice command to the device 414 to instruct the device 414 to transmit a master audio signal to the headphone system 412.

In one embodiment, upon detecting that the parent is providing an input to the device 414, the device 414 can transfer the input to the smart home controller 406. For instance, if the parent speaks into the device 414, the device can alert the smart home controller 406. In response, the smart home controller 406 can make the device 414 record the parent's voice message. When the voice message is complete, the audio can be transferred to the smart home controller 406. In response, the smart home controller 406 can generate a master audio signal based on the voice message.

In another embodiment, the parent inputs a touch command into the device 414, and in response, the device 414 transfers the command to the smart home controller 406. The smart home controller 406 can then generate a master audio signal based on the command.

The master audio signal can comprise a recording of the voice message as spoken by the parent, or may comprise a pre-recorded audio signal retrieved by the smart home controller 406 based on a comparison between the voice message and one or more pre-recorded audio signals.

The smart home controller 406 can use the master audio signal to control the headphone system's 412 volume output of the first audio signal. In some embodiments, the smart home controller 406 transfers the master audio signal to the headphone system 412. In response, the headphone system 412 decreases a volume of the first audio signal, which provides a quieter environment and lessens the child's immersion in the song. During this time, the headphone system 412 outputs the master audio signal to the child at a volume greater than the decreased volume of the first audio signal. Therefore, the child, who may otherwise not have heard the message from the parent due to the volume at which the song is played, is now able to hear the master audio signal that conveys the message.

In one embodiment, after determining that the master audio signal has been output or played in its entirety, the smart home controller 406 increases the volume of the first audio signal. In some embodiments, the increase in volume of the first audio signal occurs after a portion, but not the entirety, of the master audio signal has finished being output or played to the child.

Figure 5:
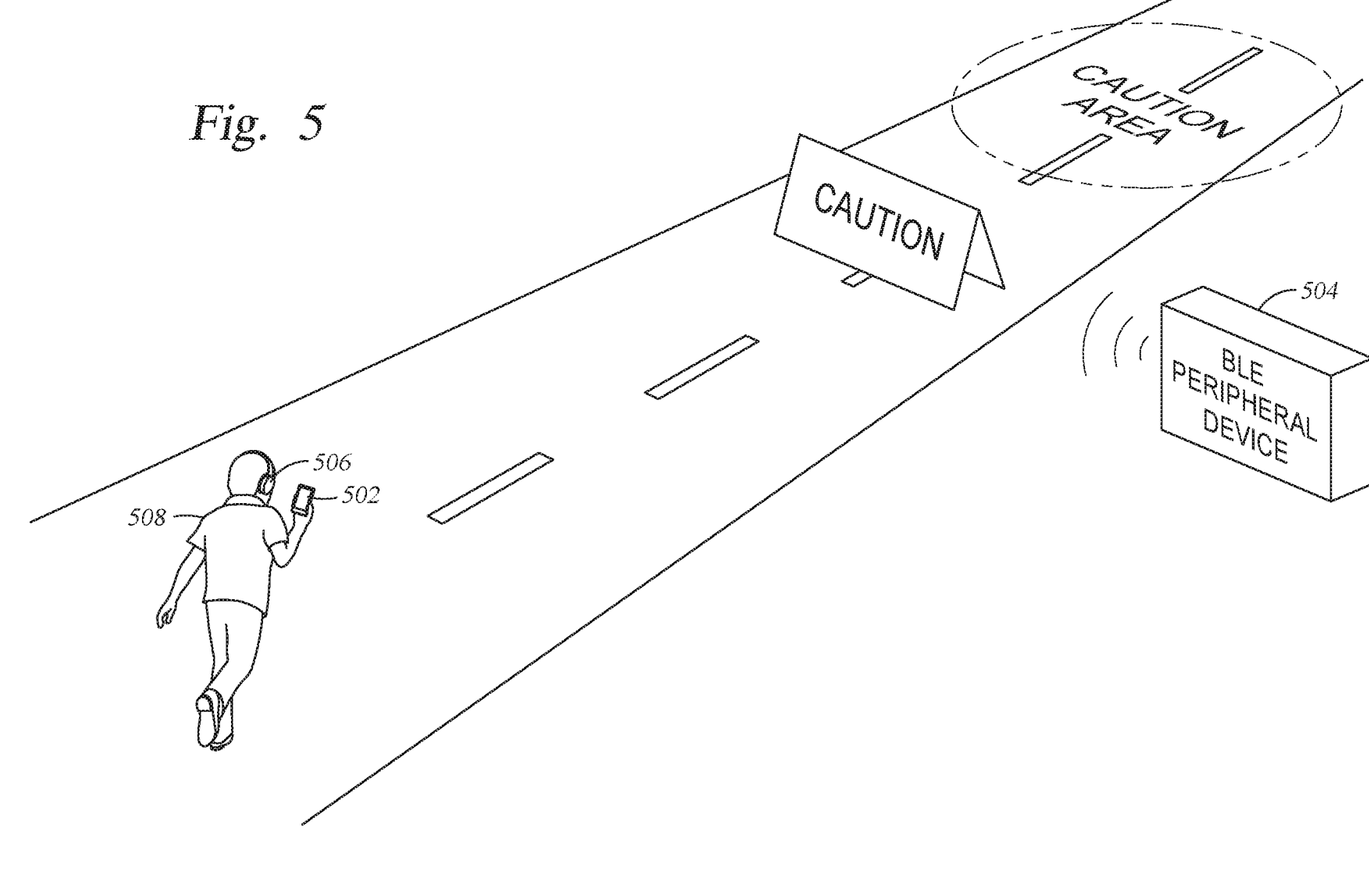
FIG. 5 is an illustration of a headphone system receiving a master audio signal from a Bluetooth Low Energy (BLE) device, according to one embodiment.

FIG. 5 is an illustration of a headphone system receiving a master audio signal from a Bluetooth Low Energy (BLE) device, according to one embodiment. In the illustrated embodiment, an audio source 502 is depicted as a mobile device streaming audio-visual content to the user 508 of the headphone system 506.

The audio source 502 can be communicatively coupled to the headphone system 506 to supply a first audio signal to the headphone system 506. The communicative coupling can include wireless or wired coupling. The headphone system 506 outputs the first audio signal to a user 508 of the headphone system 506 via one or more speakers included with the headphone system 506.

For example, the user 508 of the headphone system 506 can be a person watching and listening to a media presentation (e.g., a TV show) on the mobile device. The first audio signal can be audio associated with the media presentation, and can be supplied to the headphone system 506 wirelessly. The headphone system 506 outputs the first audio signal to the user 508, via the one or more speakers included with the headphone system 506, which helps to immerse the user in the media presentation. In the illustrated embodiment, the user 508 of the headphone system 506 is approaching a construction area that the user 508 may be unaware of due to being immersed in the media presentation. The construction area can contain a warning sign to alert the user to potential danger in a physical area, or a caution area.

In the illustrated embodiment, a BLE peripheral device 504 is located on the premises of the construction site. The BLE peripheral device 504 broadcasts an advertisement (a master audio signal), comprising information about the construction. This information may include a warning, location or coordinates, alternate route, and the like. The BLE peripheral device 504 may have a high priority assigned to it so that the headphone system 506 can determine than any audio received from the BLE peripheral device 504 has a higher priority than the audio being received from the audio source 502.

In response to receiving the master audio signal, the headphone system 506 decreases a volume of the first audio signal, which provides a quieter environment and removes the user 508 of the headphone system 506 from immersion in the media presentation. During this time, the headphone system 506 outputs the master audio signal to the user 508 at a volume greater than the decreased volume of the first audio signal. Therefore, the user 508, who may otherwise not have heard the information about the construction site due to being immersed in the media presentation now hears the master audio signal that warns the user about the construction site.

In one embodiment, after determining that the master audio signal has been output or played in its entirety, the headphone system 506 increases the volume of the first audio signal. In some embodiments, the increase in volume of the first audio signal occurs after a portion, but not the entirety, of the master audio signal has finished being output or played to the user of the headphone system 506.

Figure 6:
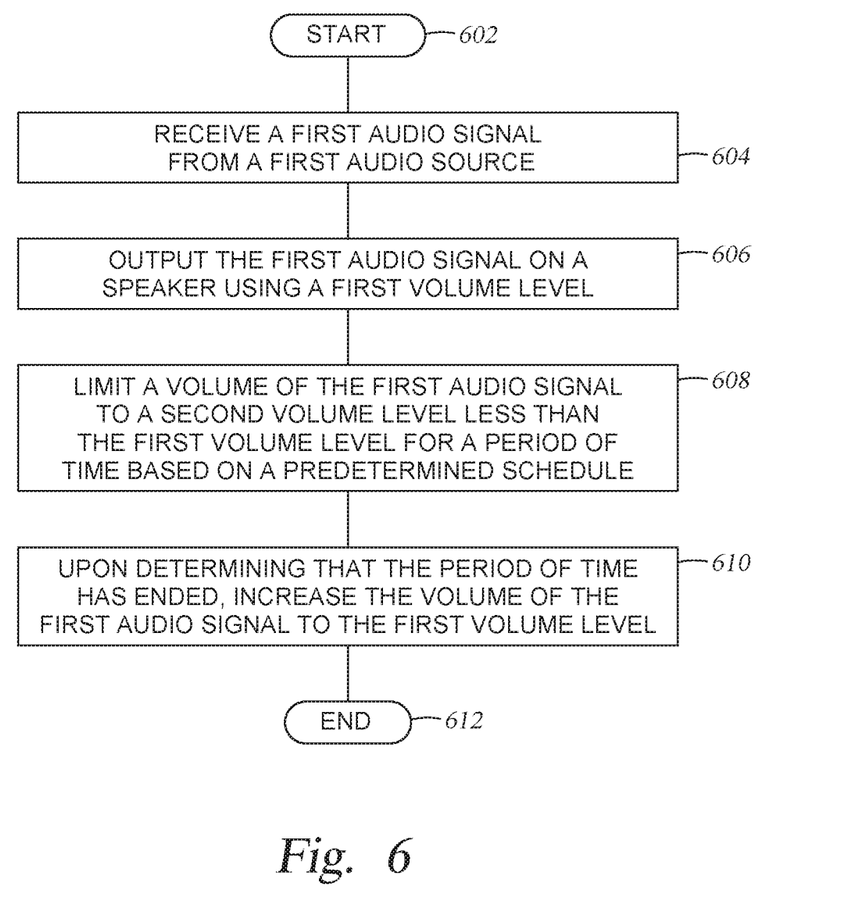
FIG. 6 is a flow chart of a method for limiting the volume output of a headphone system on a predetermined schedule, according to one embodiment.

FIG. 6 is a flow chart of a method for limiting the volume output of a headphone system on a predetermined schedule, according to one embodiment. Limiting the volume output of the headphone system on a predetermined schedule may be useful for mitigating distractions due to full use of the headphone system during critical time periods, such as at nighttime or when concentration is needed on an alternate task. The method begins at block 602.

At block 604, the headphone system receives a first audio signal from a first audio source. At block 606, the headphone system outputs the first audio signal to a user on a speaker using a first volume level. In some embodiments, the first audio signal is associated with audio from entertainment media such as a movie, music, a television show, a video game, or the like.

At block 608, the headphone system limits a volume of the first audio signal to a second volume level less than the first volume level for a period of time based on a predetermined schedule. In one embodiment, the second volume level and the predetermined schedule can be set via the first audio source. For example, a parent can set the second volume level to a minimum volume during dinner time to discourage use of the headphone system during this period. In another example, the parent can set the second volume level to a low volume from sundown to sunrise, or any other time of day, to ensure to avoid disrupting sleep or naps taken by the headphone user.

At block 610, upon determining that the period of time has ended, the headphone system increases the volume of the first audio signal to the first volume level to enable the user of the headphone system to return to normal use. The method ends at block 612.

In the current disclosure, reference is made to various embodiments. However, it should be understood that the present disclosure is not limited to specific described embodiments. Instead, any combination of the preceding features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A headphone system comprising:
a speaker;
a communication interface configured to receive a first audio signal from a first audio source hosted on a first computing device and a master audio signal from a master audio source hosted on a second computing device separate from the first computing device, wherein the first audio source and master audio source are separate from the headphone system; and
an audio control module, configured to:
output the first audio signal on the speaker using a first volume level,
receive the master audio signal,
identify a priority corresponding to the master audio signal,
compare the priority of the master audio signal to a priority of the first audio signal,
upon determining the priority of the master audio signal is greater than the priority of the first audio signal, decrease a volume of the first audio signal relative to the first volume level,
output the master audio signal on the speaker at a second volume level greater than the decreased volume of the first audio signal, and
after determining the master audio signal is finished, increase the volume of the first audio signal.

2. The headphone system of claim 1, wherein the first audio source comprises a streaming service, a media platform, or media storage, and the first audio signal is associated with audio from the first audio source.

3. The headphone system of claim 1, wherein the master audio source is a smart home controller wirelessly coupled to the headphone system.

4. The headphone system of claim 1, wherein the master audio source is a parental software application including a priority level for the master audio signal that identifies the master audio signal as having priority over the first audio signal, and establishes a priority among a plurality of master audio signals.

5. The headphone system of claim 1, wherein the master audio source is a Bluetooth Low Energy (BLE) peripheral device that broadcasts an advertisement comprising the master audio signal, wherein the master audio signal includes information about a physical area in which the headphone system is located.

6. The headphone system of claim 1, wherein the master audio signal comprises at least one of an inputted command from a user of the master audio source, a recorded audio of a voice of the user of the master audio source, and a message or pre-recorded audio based on the inputted command or recorded audio.

7. The headphone system of claim 1, wherein the first volume level is limited during a period of time based on a predetermined schedule, wherein the predetermined schedule is based on a time of day, a user-input to the master audio source, or a determination made by the master audio source.

8. A method comprising:
receiving, at a headphone system, a first audio signal from a first audio source;
outputting the first audio signal on a speaker in the headphone system using a first volume level;
in response to receiving a master audio signal from a master audio source, decreasing a volume of the first audio signal relative to the first volume level,
wherein the first audio source and the master audio source are separate from the headphone system, and
wherein the master audio source is a parental software application including a priority level for the master audio signal that identifies the master audio signal as having priority over the first audio signal, and establishes a priority among a plurality of master audio signals;
outputting the master audio signal on the speaker at a second volume level greater than the decreased volume of the first audio signal; and
after determining the master audio signal is finished, increasing the volume of the first audio signal.

9. The method of claim 8, further comprising:
identifying a priority corresponding to the master audio signal;
comparing the priority of the master audio signal to a priority of the first audio signal; and
upon determining the priority of the master audio signal is greater than the priority of the first audio signal, outputting the master audio signal on the speaker at the second volume level greater than the decreased volume of the first audio signal.

10. The method of claim 8, wherein the first audio source comprises a streaming service, a media platform, or media storage, and the first audio signal is associated with audio from the first audio source.

11. The method of claim 8, wherein the master audio source is a smart home controller wirelessly coupled to the headphone system.

12. The method of claim 8, wherein the master audio source is a Bluetooth Low Energy (BLE) peripheral device that broadcasts an advertisement comprising the master audio signal, wherein the master audio signal includes information about a physical area in which the headphone system is located.

13. The method of claim 8, wherein the master audio signal comprises at least one of an inputted command from a user of the master audio source, a recorded audio of a voice of the user of the master audio source, and a message or pre-recorded audio based on the inputted command or recorded audio.

14. The method of claim 8, wherein the volume of the first audio signal is limited during a predetermined schedule, wherein the predetermined schedule is based on a time of day, a user-input to the master audio source, or a determination made by the master audio source.

15. A method comprising:
receiving, at a headphone system, a first audio signal from a first audio source;
outputting the first audio signal on a speaker in the headphone system using a first volume level;
in response to receiving a master audio signal from a master audio source, decreasing a volume of the first audio signal relative to the first volume level, wherein the first audio source and the master audio source are separate from the headphone system, wherein the master audio source is a Bluetooth Low Energy (BLE) peripheral device that broadcasts an advertisement comprising the master audio signal, wherein the master audio signal includes information about a physical area in which the headphone system is located;
outputting the master audio signal on the speaker at a second volume level greater than the decreased volume of the first audio signal; and
after determining the master audio signal is finished, increasing the volume of the first audio signal.

16. The method of claim 15, wherein the first audio source comprises a streaming service, a media platform, or media storage, and the first audio signal is associated with audio from the first audio source.

17. The method of claim 15, further comprising:
identifying a priority corresponding to the master audio signal;
comparing the priority of the master audio signal to a priority of the first audio signal; and
upon determining the priority of the master audio signal is greater than the priority of the first audio signal, outputting the master audio signal on the speaker at the second volume level greater than the decreased volume of the first audio signal.

18. The method of claim 15, wherein the information about the physical area indicates a potential danger or obstacle related to the physical area.

* * * * *